United States Patent
Wang

(10) Patent No.: US 8,826,428 B2
(45) Date of Patent: Sep. 2, 2014

(54) EVENT DETECTION METHOD AND APPARATUS IN A DISTRIBUTED ENVIRONMENT

(75) Inventor: Yong Wang, Shenyang (CN)

(73) Assignee: Neusoft Corporation, Shenyang (CN)

( * ) Notice: Subject to any disclaimer, the term of this patent is extended or adjusted under 35 U.S.C. 154(b) by 211 days.

(21) Appl. No.: 13/536,923

(22) Filed: Jun. 28, 2012

(65) Prior Publication Data
US 2013/0152197 A1   Jun. 13, 2013

(30) Foreign Application Priority Data
Dec. 12, 2011   (CN) .......................... 2011 1 0415364

(51) Int. Cl.
*H04L 29/06*   (2006.01)

(52) U.S. Cl.
USPC .............................................. 726/22; 726/26

(58) Field of Classification Search
USPC ..................................................... 726/22, 26
See application file for complete search history.

(56) References Cited

U.S. PATENT DOCUMENTS

2008/0052780 A1 * 2/2008 Cao et al. ........................ 726/23
2009/0006320 A1   1/2009 Ding et al.

FOREIGN PATENT DOCUMENTS

CN          1719832 A      1/2006
CN        101060396 A     10/2007

* cited by examiner

*Primary Examiner* — Jeffrey Pwu
*Assistant Examiner* — Thong Truong

(57) ABSTRACT

An event detection method in a distributed environment includes, when a non-parsable event occurred during grammar parsing, executing the following process until the first grammar parser module obtains a detection result, including the event that the current grammar parser module can not parse in a scheduling request as a next event to be detected and sending it to the grammar control module, scheduling, by the grammar control module, other grammar parser module as the target grammar parser module for further parsing based on the scheduling strategy table, performing grammar parsing based on the local parsing table in the scheduled target grammar parser module, returning parsing results to the grammar control module for further parsing when no non-parsable event is found; or repeating the above process with the target grammar parser module as a new current grammar parser module when an non-parsable event is found.

11 Claims, 9 Drawing Sheets

EVENT DETECTION METHOD AND APPARATUS IN A DISTRIBUTED ENVIRONMENT

FIELD OF THE INVENTION

The present invention relates to the field of network security event detection, and more particularly, to a method and apparatus for detecting network attack events in a distributed environment.

BACKGROUND OF THE INVENTION

When a network user is carrying out network behaviors, illegal intruders usually intrude private space of the network user via network attacks so as to acquire private information of the network user, resulting in private information leakage of the network user. Therefore, when a user is surfing on Internet, it is required to detect network attacks, so as to prompt the user to prevent private information leakage when attacks are detected.

A network intrusion detection system based on string matching is proposed in "Snort: Lightweight Intrusion Detection for Networks" by Martin Roesch in 1999. In this network intrusion detection system, an attack can only be detected depending on whether a single intercepted network packet includes certain character feature or whether some certain ports are open. Furthermore, in this network intrusion detection system, it is impossible to consider an attack as a process, which leads to a high false negative rate and a high false positive rate.

In order to identify an attack as a process, there have been proposed some detection methods and systems based on events, in which attack behaviors are classified into types of "presence", "sequence" and "partial order" (see S. Kumar and E. H. Spafford, "Pattern Matching Model for Misuse Intrusion Detection", Proc. Of the 17$^{th}$ National Computer Security Conference, 1994), attack rules are written with procedural language or descriptive language, and variables are used to maintain status, allowing efficient identification of network attack behaviors.

However, in case of writing in procedural language (see W. Lee, C. Park and S. Stolfo, "Automated Intrusion Detection using NFR: Methods and Experiences", USENIX Intrusion Detection Workshop, 1999; and V. Paxson, "Bro: A System for Detection Network Intruders in Real-time", USENIX Security Symposium, 1998), since attack rules are described in procedural language, rule developers have to understand execution mechanism of the language itself thoroughly when developing attack detection rules, which makes it very difficult or even infeasible to develop protocol level detection modules and attack rules through cooperation by dozens or up to nearly one hundred of people.

While in case of writing in descriptive language (see R Sekar, Y Guang, S Verma, T Shanbhag, "High-Performance Network Intrusion Detection System", ACM Conference On Computer and Communications Security, 1999), since the descriptive language is based on regular grammars, expressional ability is limited. Furthermore, since the detection mechanism of regular grammars is a finite automaton with very weak support for hierarchical processing capability required by protocol parsing. Thus it is not applicable to protocol parsing.

In the patent with grant No. CN101060396B (the corresponding U.S. Pat. No. 7,913,304), entitled "Event Detection Method and Device", an event detection method with protocol hierarchical description capability is proposed. In this method, detection rules for events are preset using predicative context-free grammar. The preset detection rules are resolved to generate a parsing table for a pushdown automaton. The parsing table supports parallel parsing. Then, the received events are parsed with the generated parsing table to obtain detection results. Here, when generating the parsing table of the pushdown automaton, first of all, the protocol rules and attack rules are resolved to obtain a syntax tree. Then, item sets of the predicative context-free grammar are generated with predicative LR(0) generating algorithm. Next, the item sets are transformed into a corresponding parsing table of a pushdown automaton, and the parsing table includes an action table ACTIION and a jump table GOTO. The above application is incorporated into the present application in its entirety by reference. In this method, instead of specific protocol command, an event concept is used to detect attacks, which makes it possible to divide the development of intrusion detection system into three independent parts (event parsing engine development, protocol parsing development and attack detection rule development) for separate implementation, wherein each part may be expanded independently without influencing other parts, thus improving system's extendibility. Further, with this method, hierarchy of complex applications may be described, which enhances the capability of describing network attacks and increases attack detection efficiency.

However, in practice of intrusion detection system, it is often necessary to have software modules distributed in different processes (or threads) cooperate with each other. As shown in FIG. 1, software modules $A_1$, $A_2$ and $A_3$ are distributed in different processes $P_1$, $P_2$ and $P_3$. Software module $A_1$ receives an outside event to be detected, it then needs to pass the event to $A_2$ and further pass it to $A_3$ for processing if necessary, thus sophisticated attacks can be detected. In such case, the grammar G may be divided into several sub-grammars, such as $G_1$, $G_2$ and $G_3$. Then, each software module is only responsible for one sub-grammar, and cooperation among various software modules is ensured with the distributed grammar system.

In such a system, it is not only required to define protocol rules and attack rules within individual grammar parser modules, but also to define cooperation relationship among various grammar parser modules, that is, to define when to call which grammar parser module for grammar parsing processing. While in the event detection method based on predicative context-free grammar that proposed in the above-mentioned patent with grant No. CN101060396B, it is only possible to define events and relationship among events within one software module and it's impossible to describe event relationship among independent executive entities, which makes this method not applicable to the above described distributed environment.

SUMMARY OF THE INVENTION

In view of the above problems, an event detection method and apparatus in a distributed environment are provided, in which a grammar control module and a plurality of grammar parser modules are provided, wherein the grammar control module schedules, based on a scheduling strategy table generated in advance, one or more grammar parser modules of the plurality of grammar parser modules to perform parsing according to the local parsing table in the grammar parser modules to obtain detection results. With the above detection method, cooperation strategy among grammar parser modules may be accurately defined by using the scheduling strategy table in the grammar control module, thus ensuring that grammar parser modules may cooperate when detecting sophisticated attacks. Furthermore, since the grammar control module and grammar parser modules employ asynchronous parallel processing mode, detection efficiency may be improved. Furthermore, cooperation strategy among grammar parser modules is defined in the grammar control module, while the grammar parser module only needs to generate its own item sets without considering influence of other modules, which ensures each grammar parser module of the detection apparatus having sufficient independence and hence has a very good extendibility.

According to an aspect of the present invention, there is provided an event detection method in a distributed environment, which is carried out by an apparatus comprising a grammar control module and a plurality of grammar parser modules including at least a first grammar parser module for initiating the detection of event, the method comprising: after the first grammar parser module generates a non-parsable event during an parsing process of a received event to be detected, executing the following process under the control of the grammar control module until the first grammar parser module obtains a detection result of the event to be detected: at the current grammar parser module, including into a scheduling request that the current grammar parser module can not parse as a next event to be detected and sending the scheduling request to the grammar control module; scheduling, by the grammar control module, other grammar parser module of the plurality of grammar parser modules as a target grammar parser module for grammar parsing based on the generated scheduling strategy table, according to the next event to be detected included in the scheduling request, the scheduling strategy table reflecting an association relation between the event to be detected and the grammar parser module used to process the event to be detected; parsing the next event to be detected based on a local parsing table of the target grammar parser module in the scheduled target grammar parser module; returning, by the target grammar parser module, the parsing result to the grammar control module for further grammar parsing when no event is found that the target grammar parser module can not parse during the parsing process of the next event to be detected; or repeating the above-mentioned process with the target grammar parser module as a new current grammar parser module when an event is found that the target grammar parser module can not parse during the parsing process of the next event to be detected. Further, local parsing tables of the grammar parser modules are generated, under the control of the grammar control module, for event detection rules preset by predicative context-free grammars, by means of a distributed item sets generating algorithm.

In one or more examples of the above-mentioned aspect, generating local parsing tables of grammar parser modules and scheduling strategy table of the grammar control module by means of the distributed item sets generating algorithm may comprise: for each grammar parser module, when the grammar parser module determines that there exist a non-resolvable event during grammar analysis, sending an item set generating request non-resolvable to the grammar control module; after receiving the item set generating request, determining, by the grammar control module, a target grammar parser module according to an open event list registered in advance by each grammar parser module, based on the event included in the item set generating request, then sending an item set generating request including the event to the target grammar parser module; after receiving the item set generating request, generating, by the target grammar parser module, item sets with the event as the grammar target, based on the predicative context-free grammar, and converting the generated item sets into a pushdown automaton parsing table, the pushdown automation parsing table supporting parallel parsing; after generating the item sets of the target grammar parser module, returning, by the target grammar parser module, a first one of the generated item set numbers and a list of events available for reception to the grammar control module; and generating, by the grammar control module, the scheduling strategy tables based on the item set number and the list of events available for reception returned by the grammar parser modules.

In one or more examples of the above-mentioned aspect, the open event list of the grammar control module are generated by various grammar parser modules through registering events that other grammar parser modules are capable of invoking with the grammar control module.

In one or more examples of the above-mentioned aspect, scheduling, by the grammar control module, other grammar parser module of the plurality of grammar parser modules as a target grammar parser module for further grammar parsing based on the generated scheduling strategy tables according to scheduling requests sent by the current grammar parser module may comprise: after receiving the scheduling request including the next event to be detected sent by the current grammar parser module, searching, by the grammar control module, in the scheduling strategy table the target grammar parser module matching the next event to be detected; and after finding out the target grammar parser module, sending, by the grammar control module, the scheduling request including the next event to be detected to the target grammar parser module, so as to request the target grammar parser module to perform grammar parsing on the next event to be detected.

In one or more examples of the above-mentioned aspect, the scheduling request may further include a shared parsing stack.

In one or more examples of the above-mentioned aspect, a plurality of co-routines are employed to allow asynchronous parallel processing in each of the grammar parser modules and the grammar control module. The co-routines are light weight user threads maintained by the grammar parser module for each session.

According to another aspect of the present invention, there is provided an event detection apparatus in a distributed environment comprising: a grammar control module and a plurality of grammar parser modules including at least a first grammar parser module, wherein each of the grammar parser modules comprises: a first receiving unit configured to receive an event to be detected or receive a scheduling request including a next event to be detected from the grammar control module, and receive a parsing result returned from the grammar control module; a grammar parser unit configured to perform grammar parsing on the received event to be detected or the next event to be detected in the scheduling request, based on the generated local parsing table of the grammar parser module; a scheduling request generating unit configured to, when a non-parsable event is found during the parsing process of the events to be detected, generate a scheduling request that includes the non-parsable event as the next event to be detected; a first transmitting unit configured to transmit the scheduling request to the grammar control module, or output detection results of the detected event to outside or return the parsing results to the grammar control module when the grammar parser module obtains parsing results; wherein, local parsing tables of the grammar parser modules are generated, by means of a distributed item sets generating algorithm, for event detection rules preset by distributed predicative context-free grammars under the control of the grammar control module, wherein the grammar control module comprises: a second receiving unit configured to receive the scheduling request including the next event to be detected or parsing results including generated event from the target grammar parser module; a searching unit configured to search in the generated scheduling strategy table a target grammar parser module matching the next event to be detected, after receiving the scheduling request including the next event to be detected, the scheduling strategy table reflecting association relation between the event to be detected and the grammar parser module used to process the event to be detected; a second transmitting unit configured to, after finding out the target grammar parser module, transmit the scheduling request including the next event to be detected to the target grammar parser module, and transmit the received parsing results to the grammar parser module issuing the scheduling request for further grammar parsing.

In one or more examples of the above-mentioned aspect, the grammar parser modules may further comprise: a local parsing table generating unit configured to generate, by means of a distributed item sets generating algorithm, item sets of the grammar parser module for event detection rules preset by the distributed predicative context-free grammars under the control of the grammar control module, and convert them into a local parsing table.

In one or more examples of the above-mentioned aspect, the grammar parser module may further comprise: an item set generating request generating unit configured to generate an item set generating request when it is determined that there exists an non-resolvable event during generating the local parsing table, the item set generating request including the non-resolvable event as the next event to be resolved, wherein the first transmitting unit in the grammar parser module is further configured to transmit the generated item set generating request to the grammar control module, and forward it to the target grammar parser module under the control of the grammar control module, the target grammar parser module being determined, according to the open event list registered by each grammar parser module in advance, by the searching unit in the control process based on the next event to be resolved included in the item set generating request. After generating item sets of the target grammar parser module, the first transmitting unit in the target grammar parser module transmits a first one of the generated item set numbers and a list of events available for reception to the grammar control module, and the grammar control module further comprises a scheduling strategy table generating unit configured to generate a scheduling strategy table based on the received item set cluster number and the list of events available for reception.

In one or more examples of the above-mentioned aspect, the grammar control module may further comprise: an open event list generating unit configured to generate an open event list according to events capable of being invoked by other grammar parser modules that are registered by various grammar parser modules.

In one or more examples of the above-mentioned aspect, each of the grammar parser modules and the grammar control module may further comprise: an asynchronous scheduling unit configured to use a plurality of co-routines to allow asynchronous parallel processing in each of the grammar parser modules and the grammar control module, the co-routines being light weight user threads maintained by the grammar parser module for each session.

To achieve the above described and related objects, one or more aspects of the present invention include features that will be described in detail hereinbelow and specifically defined in claims. The following description and accompanying drawings elaborate some illustrative aspects of the present invention. However, these aspects only illustrate some of the various ways in which the principle of the present invention may be applied. Furthermore, it is intended that the present invention comprises all these aspects and their equivalents.

BRIEF DESCRIPTION OF THE DRAWINGS

The above-mentioned and other objects, features and advantages of the present invention will become more apparent from the following detail description made with reference to drawings. In the drawings.

Identical reference numerals indicate similar or corresponding features or functions throughout the figures.

DETAILED DESCRIPTION OF THE INVENTION

Figure 1:
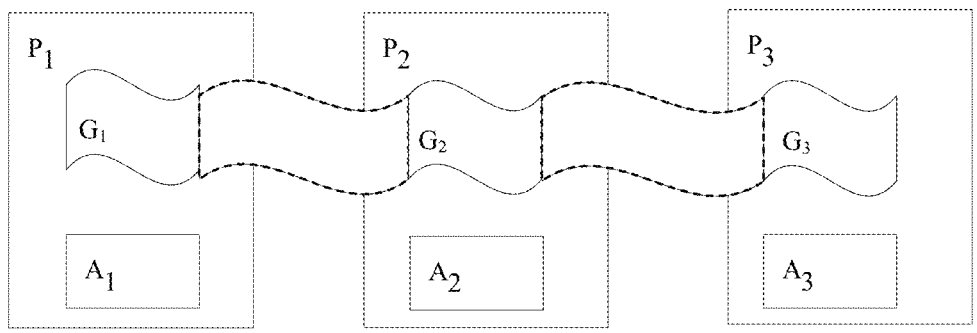
FIG. 1 is a diagram showing an example of execution of a plurality of grammar modules in different processes.

Aspects of the present disclosure will be described below. It should be noted that the teachings of the present invention may be embodied in various forms, and any specific structures, functions or both in the present disclosure are only representative. According to teachings of the present invention, those skilled in the art should understand that one aspect disclosed herein may be implemented independently of any other aspects, and two or more aspects of these aspects may be combined in various manners. For example, an apparatus may be realized or a method may be practiced according to any number of aspects described herein. In addition, the apparatus may be realized or the method may be practiced according to other structures, functions or structures and functions other than those in one or more aspects described herein or not being those in one or more aspects described herein. Furthermore, any aspect described herein may include at least one element of the claims.

Embodiments of the present invention will be described below with reference to drawings.

In the present invention, detection rules are preset using a distributed predicative context-free grammar. The detection rules include distributed protocol rules and attack rules. The distributed preset process mainly includes: defining, by rules, protocol events on multiple different grammar parser modules and relationship among protocol events on different grammar parser modules, then defining attack rules on a certain grammar parser module based on protocol atomic events or protocol abstract events provided in this grammar parser module or other grammar parser modules. In other words, an attack is defined as occurrence of one protocol event or successive occurrence of multiple protocol events that satisfy certain predicates and distributed on several processes.

The distributed predicative context-free grammar G according to the present invention is a set consisting of a plurality of sub-grammars:

$$G = G_1 \cup G_2 \cup \ldots \cup G_n$$

wherein $G_i$ is a quintuple with a format as follows:

$$G_i = \{V_{iN}, V_{iT}, S_i, R_i, P_i\}$$

Wherein, $V_{iN}$ is a nonterminal symbol set of $G_i$, including nonterminal symbol $v_{in}$, $V_{iT}$ is a terminal symbol set of sub-grammar $G_i$, including terminal symbol $V_{it}$, $V_{iT}$ and $V_{iN}$ are called symbol set $V_i$, an item in symbol set $V_i$ is referred to as a symbol $v_i$, $S_i$ is a target grammar symbol, $S_i \in V_{iN}$, $R_i$ is the production set of grammar, $P_i$ is the predicate set of grammar. A predicate is the restrictive condition that symbols on the right hand side of the production should satisfy, and is constituted by a combination of logical operators, arithmetic operators and function calls. In general, a production of $G_i$ is in the following format:

$$v_{in}:w$$

The left hand side of the production is a nonterminal symbol $v_{in} \in V_{iN}$, the right hand side w of the production contains predicative symbols $v_i \in V_i$ of a grammar $G_i$ and/or predicative symbols $v_j \in V_j$ of other grammar $G_j (i \neq j)$, semantics of the production is that left hand side symbol of the production are derived from the predicative symbols on the right hand side.

A specific attack grammar G will be taken as an example below to explain how to use the distributed predicative context-free grammar to define a distributed network attack.

The grammar G contains two sub-grammars, $G_1$ and $G_2$. In grammar $G_1$, the terminal symbol set $V_{1T} = \{t\}$, wherein the protocol terminator t represents an original tcp packet, and the nonterminal symbol set $V_{1N} = \{REQ, ACK\}$. The production set R of grammar $G_1$ includes:

| | |
|---|---|
| REQ: t($p_{11}$) | → Rule$_{11}$ |
| ACK: t($p_{12}$) | → Rule$_{12}$ |
| \| ACK t($p_{12}$) ; | → Rule$_{13}$ |
| S : ATK; | → Rule$_{14}$ |

The nonterminal symbol REQ denotes a protocol request event that consists of a protocol terminal symbol t that satisfies the predicate $p_{11}$. The nonterminal symbol ACK denotes a protocol response event that consists of a protocol terminal symbol t that satisfies the predicate $p_{12}$. The target grammar symbol S is the parsing target of grammar $G_1$. The nonterminal symbol S is not derived from the local event, but resulted from event defined in the sub-grammar $G_2$.

In the grammar $G_2$, the nonterminal symbol set $V_{2N} = \{ATK1, ATK2, ATK\}$. No target grammar symbol is defined in the grammar $G_2$, which means that the grammar $G_2$ lacks parsing target in itself and that the grammar $G_2$ may only function as a serving grammar for other grammars. The production set R of grammar $G_2$ includes:

| | |
|---|---|
| ATK1 : REQ ($p_{21}$) ; | → Rule$_{21}$ |
| ATK2 : ACK ($p_{22}$) ; | → Rule$_{22}$ |
| ATK : ATK1 | → Rule$_{23}$ |
| \| ATK2 ; | → Rule$_{24}$ |

The nonterminal symbol ATK1 denotes an attack that consists of a protocol nonterminal symbol REQ of $G_1$ that satisfies the predicate $p_{21}$. The nonterminal symbol ATK2 denotes an attack that consists of a protocol nonterminal symbol ACK of $G_1$ that satisfies the predicate $p_{22}$. The nonterminal symbol ATK is derived from ATK1 or ATK2.

In this manner, the distributed grammar parsing system comprised of a grammar parser module $M_1$ and a grammar parser module $M_2$, which bind to grammars $G_1$ and $G_2$, respectively, will be able to make some form of interaction. That is, when the grammar parser module $M_1$ parses event S, since the grammar parser module $M_1$ doesn't know what it is ATK, it transfers the control right to the grammar control module $M_0$. Under the scheduling of the grammar control module $M_0$, the control right is transferred to the grammar parser module $M_2$ for parsing. However, the grammar parser module $M_2$ also lacks knowledge about REQ and ATK, therefore under the scheduling of grammar control module $M_0$, the control right is returned to grammar parser module $M_1$. Thus, an event detection in a distributed environment is realized by transfer of the control right.

Figure 2:
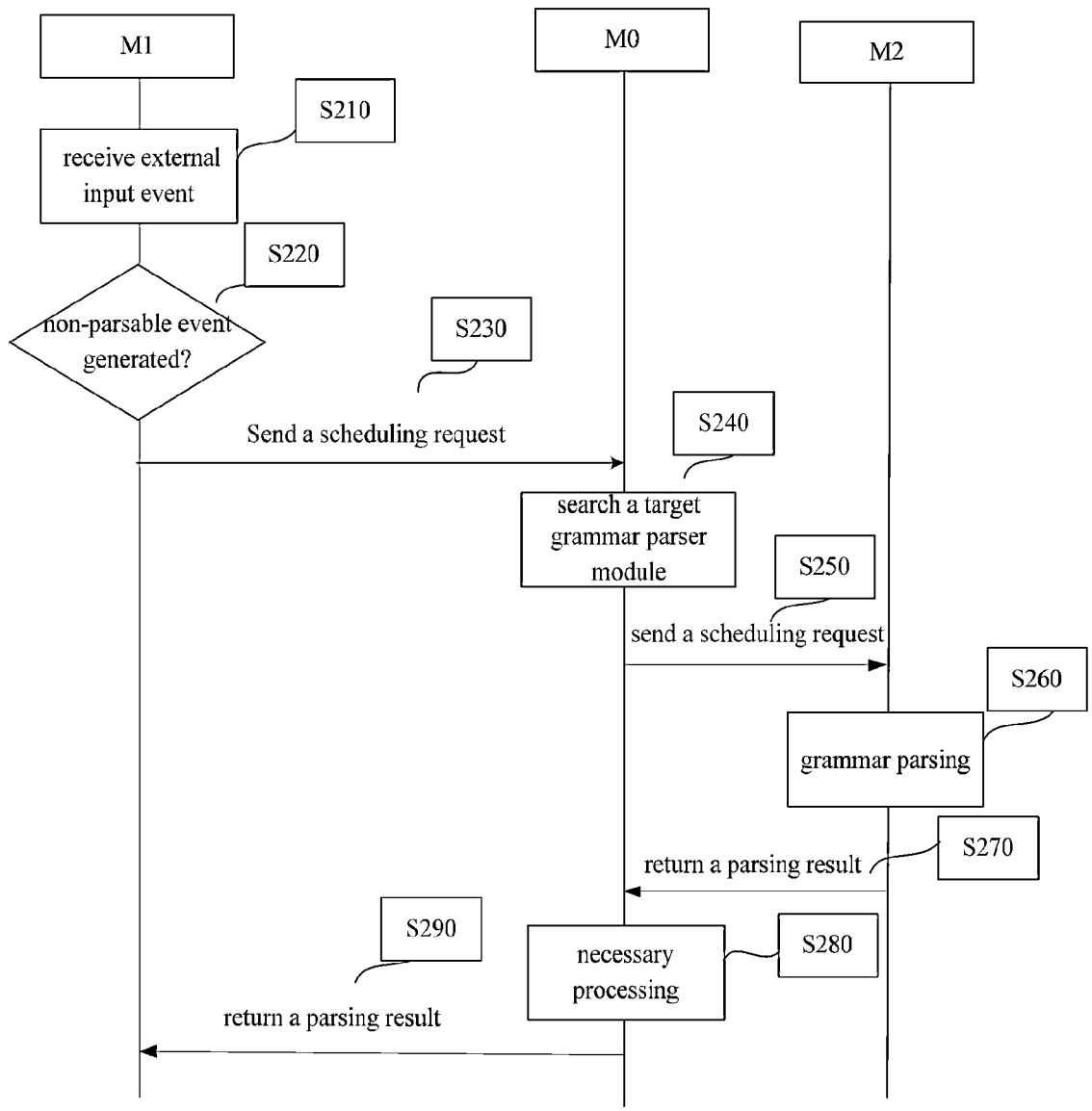
FIG. 2 is a flowchart showing an event detection method in a distributed environment according to the present invention.

FIG. 2 is a flowchart showing one example of an event detection method in a distributed environment according to the present invention. The event detection method in a distributed environment is carried out by a grammar control module and a plurality of grammar parser modules including at least a first grammar parser module for initiating the detection of event. In this example, two grammar parser modules $M_1$ and $M_2$ are included, wherein the module $M_1$ is the first grammar parser module.

As shown in FIG. 2, first of all, in step S210, the first grammar parser module $M_1$ receives an external input event, namely the event to be detected. Then, in step S220, parsing is made according to the local parsing table of the first grammar parser module $M_1$, and it is determined whether the event to be detected (e.g., t, in certain state) needs to be transferred to other grammar parser modules for processing, that is, whether any event that is impossible to be parsed is generated in the parsing process. Generation of the local parsing table of the grammar parser module will be described in detail below.

If it is determined during parsing that the event to be detected needs to be transferred to other grammar parser modules for processing in certain states, that is, an event that can not be parsed by the grammar parser module $M_1$ is generated, i.e., the determination in step S220 is YES, the non-parsable event is included in a scheduling request as the next event to be detected, and the scheduling request is sent to the grammar control module $M_0$ (step S230). For example, the non-parsable event and a shared parsing stack are encapsulated as a scheduling request and sent to the grammar control module $M_0$.

After the grammar control module $M_0$ receives the scheduling request from the grammar parser module $M_1$, in step S240, the grammar control module $M_0$ searches in the pre-generated scheduling strategy table an external grammar parser module associated with the next event to be detected, based on the next event to be detected and the top state of the shared parsing stack that are contained in the received scheduling request. The scheduling strategy table is a table reflecting the association relation between the event to be detected, the top state of the shared parsing stack and the corresponding grammar parser module. In one example, the scheduling strategy table is generated beforehand by the first item set number returned by various grammar parser modules and a list of events that is available to receive, the item sets of the grammar parser module is generated by means of a distributed item sets algorithm when various grammar parser modules are forming local generation tables.

After an associated external grammar parser module, i.e., the target grammar parser module, $M_2$ in this example, is founded, in step S250, the grammar control module $M_0$ transmits a scheduling request including the next event to be detected to the grammar parser module $M_2$.

After receiving this scheduling request, in step S260, the grammar parser module $M_2$ performs grammar parsing with its local parsing table and shared parsing stack. Then, in step S270, if an parsing result can be obtained in the grammar parser module $M_2$, then the parsing result for the next event to be detected and shared parsing stack are transmitted to the grammar control module $M_0$, for example, the parsing result and shared parsing stack are encapsulated in the response message to transmit to the grammar control module $M_0$. It is to be noted that, if it is determined during parsing in the grammar parser module $M_2$ that other grammar parser modules are necessary for further parsing, that is, an event that the grammar parser module $M_2$ can not parse is generated, a further scheduling request is sent to the grammar control module $M_0$, then the above mentioned steps S220 to S290 are repeated for further processing.

After receiving the parsing result, in step S280, the grammar control module $M_0$ performs necessary processing according to the scheduling strategy table, then in step S290, returns the parsing result back to the grammar parser module sending the scheduling request (in this example, the first grammar parser module $M_1$).

After receiving the parsing result, the grammar parser module $M_1$ that sends the scheduling request message continues conducting grammar parsing on the currently processed event with the parsing result. If the grammar parser module concludes a parsing result and the grammar parser module is the first grammar parser module, then the parsing result is outputted as a detection result. If the grammar parser module is not the first grammar parser module, then it is continued to return the parsing result to the grammar control module $M_0$.

In case that more than two grammar parser modules exist, the above mentioned process is continuously repeated until the first grammar parser module $M_1$ obtains the detection result of the event to be detected.

Figure 3:
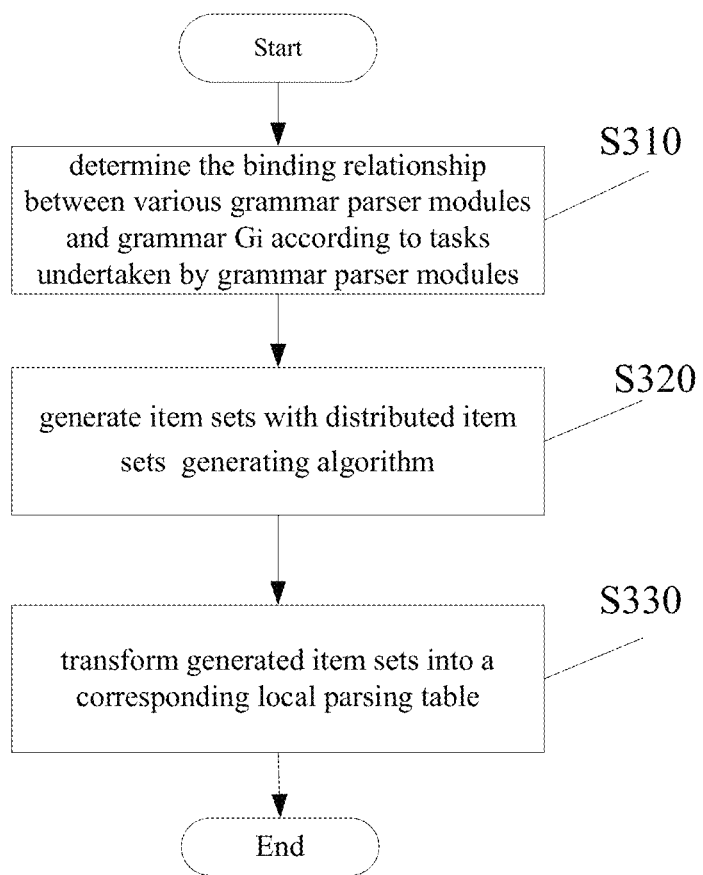
FIG. 3 is a flowchart showing a generation process of a local parsing table in a grammar parser module.

FIG. 3 is a flowchart showing a generation process of a parsing table in a grammar parser module.

As shown in FIG. 3, in step S310, the event detection apparatus in a distributed environment determines the binding relationship between various grammar parser modules and grammar $G_i$ according to tasks undertaken by grammar parser modules. Subsequently, in step S320, under the control of the grammar control module, item sets are generated, with a distributed item sets generating algorithm, for event detection rules preset using distributed predicative context-free grammar. Then, in step S330, grammar parser modules transforms generated item sets to obtain corresponding pushdown automaton parsing table, i.e., the local parsing table. The pushdown automaton parsing table supports parallel parsing.

Figure 4:
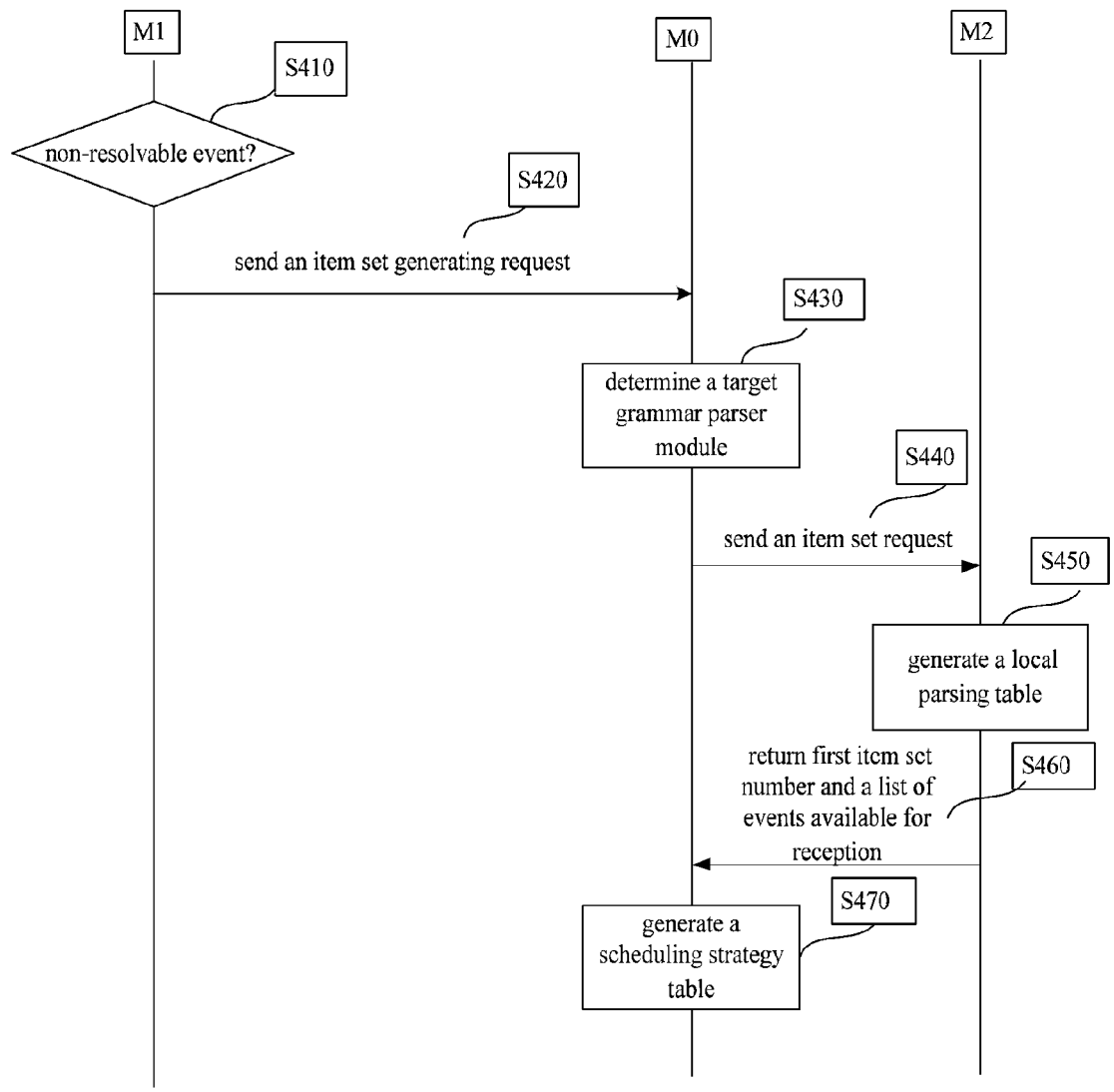
FIG. 4 is a flowchart showing an example of generating a local parsing table of a grammar parser module and a scheduling strategy table of a grammar control module with a distributed item sets generating algorithm.

FIG. 4 explains the generation process of the local parsing table of the grammar parser module and the scheduling strategy table of the grammar control module with two grammar parser modules $M_1$, $M_2$ and the grammar control module $M_0$ as examples.

As shown in FIG. 4, in step S410, the grammar parser module $M_1$ conducts grammar analysis to obtain item sets, and determines whether its own parsing target needs to be derived with events defined in other grammar parser modules, namely, whether there is any non-resolvable event. When it is determined there is a non-resolvable event, for example, the module $M_1$ finds out that the parsing target S needs to be derived by the event ATK defined in other grammar parser modules, in step S420, an item set generating request containing the event such as ATK is sent to the grammar control module $M_0$.

After receiving the item set generating request sent by the grammar parser module $M_1$, in step S430, the grammar control module $M_0$ determines the target grammar parser module, in this example, the grammar parser module $M_2$, according to the open event list registered by each grammar parser module, based on events contained in the received item set generating request. Then, in step S440, the grammar control module $M_0$ sends an item set generating request containing the event such as ATK to the grammar parser module $M_2$.

After receiving the item set generating request, in step S450, the grammar parser module $M_2$ generates item sets with the event such as ATK as the target, and converts the item set into the local parsing table. Regarding how to generate the item sets, it has been described in detail in the patent application with grant No. CN101060396B, which is incorporated herein by reference. Then, in step S460, the grammar parser module $M_2$ returns a first one of the generated item set numbers such as item set $I_{20}$ and the list of events available for reception to the grammar control module $M_0$.

After receiving the item set number and the list of events available for reception from the grammar parser module $M_2$, the grammar control module $M_0$ establishes relationship among item sets of grammar parser modules according to the above-mentioned information, so as to obtain a scheduling strategy table.

When using the distributed item sets generating algorithm, the above-mentioned process is recursively carried out until there is no sub-target not yet resolved in all the grammar parser modules, thereby obtaining the distributed item sets.

The distributed parsing table constructing process will be explained below with reference to FIGS. 5A to 5E, with the above-mentioned grammar parser modules $M_1$ and $M_2$ as examples, wherein the grammar parser module $M_1$ is the first grammar parser module.

Figure 5A:
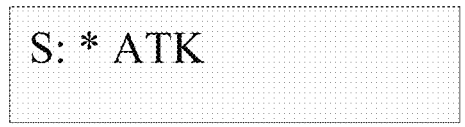
FIGS. 5A to 5E are diagrams explaining configuration of distributed parsing table with grammar parser module $M_1$ and $M_2$ as an example.

According to traditional item sets generating algorithms, first of all, an initial item set only containing S would be obtained, as shown in FIG. 5A.

Figure 5B:
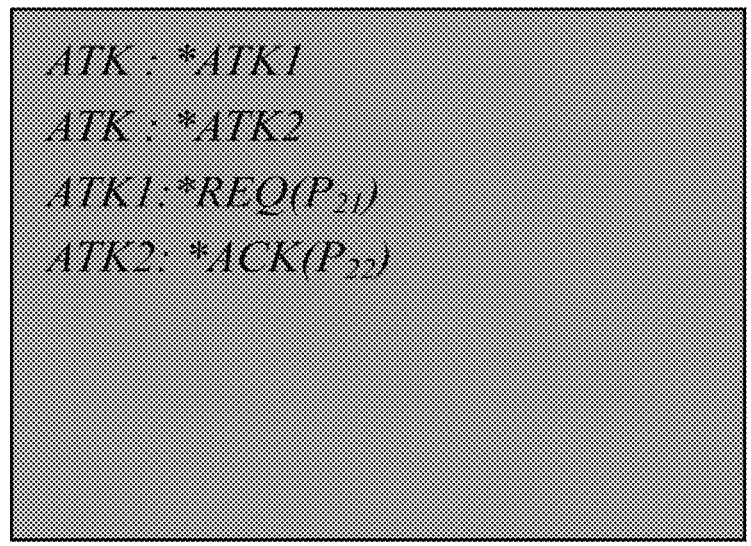

Then, closure operation is continued, and when more items are introduced, since these items are those corresponding to rules located in other grammar parser modules, i.e., remote items, these remote items are temporarily considered as a whole, as shown in FIG. 5B.

Figure 5C:
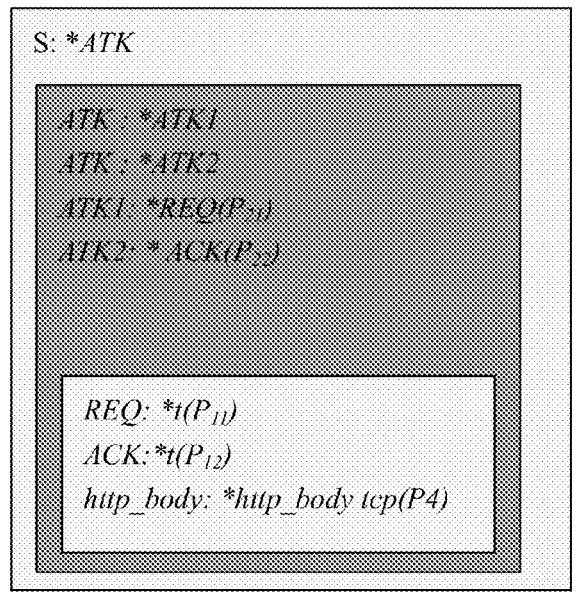

The item set configuration shown in FIG. 5C may be obtained by recursively performing closure operation. The item set shown in FIG. 5C is in fact one obtained by traditional method, however, this item set is obviously not the expected one, because this item set includes those of both modules $M_1$ and $M_2$, which is not in conformity with the design idea of the present invention. The gist of the item sets generating algorithm according to the present invention is to hide the item sets corresponding to the grammar $G_i$ inside the grammar parser module $M_i$ as much as possible, rather than expanding it into other grammar parser modules $M_j$. Thus each grammar parser module does not need to know knowledge inside other grammar parser modules, and hence improves extendibility.

In the present invention, it is necessary to divide the above global item set in FIG. 5C into several item sets, i.e. local item sets, and then establishes "inclusion" relationship among those item sets.

In this manner, when the grammar parser module $M_1$ finds out that it has a parsing target while this target needs to be derived from the event ATK present in other grammar parser modules, then the grammar parser module $M_1$ includes the event (ATK) in the item set generating request, and the event (ATK) is submitted to the grammar control module $M_0$. The previous item set $I_{10}$ is transferred to the grammar control module $M_0$ at the same time.

After the grammar control module $M_0$ receives this request, it finds out that the grammar parser module $M_2$ may resolve the event according to the open event list registered by each grammar parser module, and thus the grammar control module $M_0$ submits an item set generating request with ATK as the target to the grammar parser module $M_2$.

After the grammar parser module $M_2$ receives the request, the grammar parser module $M_2$ generates item sets with ATK as the target according to the local grammar $G_2$, and returns the first item set $I_{20}$ and the list of events available for reception (i.e., t) to the grammar control module $M_0$.

Thereafter, the grammar control module $M_0$ establishes relationship among local item sets of various grammars according to the above-mentioned information, so as to obtain the scheduling strategy table. For each inclusion relation that transfers processing to other grammar parser modules, the grammar control module $M_0$ inserts a virtual state into the state stack, thus for each return, an action of deleting a virtual state from the state stack is added.

For example, for the above-mentioned case, two operations will be added to the module $M_0$'s scheduling strategy table, namely shift in operation and shift out operation, respectively.

The shift in operation is as follows:
State: $I_{10}$
Event: t
Action: shifting in $I_{20}$ and then passing control to the grammar parser module $M_2$.

The shift out operation is as follows:
State: $I_{20}$
Event: ATK
Action: shifting out $I_{20}$ and then passing control to the grammar parser module $M_1$.

After the grammar control module $M_0$ completes the above-mentioned procedures, it will reply the grammar parser module $M_1$ with a response message that includes a list of events available for reception (i.e., t). Therefore, grammar parser module $M_1$ may add an item in the local parsing table, whose contents are as follows:
State: $I_{10}$
Event: t
Action: Passing control to the grammar control module $M_0$.

Figure 5D:
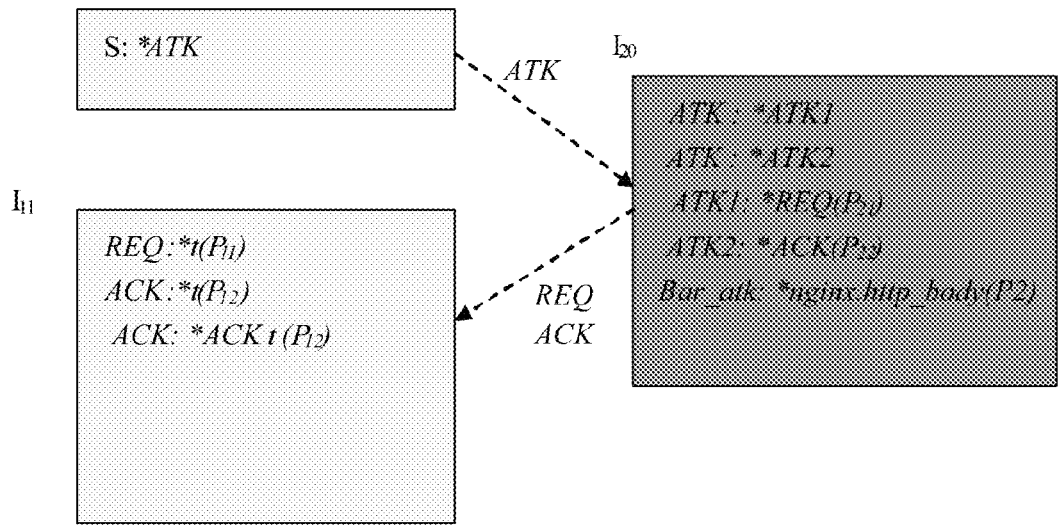

The above-mentioned process is recursively carried out, for example, the grammar parser module $M_2$ further finds out that REQ and ACK are external events, therefore further sends these two events and the current item set number to the grammar control module $M_0$ for further parsing, resulting in the distributed item sets shown in FIG. 5D.

In the distributed item sets shown in FIG. 5D, the "inclusion" relationship is denoted by a dashed line, and by using the "inclusion" relationship, the system may be in one of the following three states:
A) $I_{10}$
B) $I_{10}+I_{20}$
C) $I_{10}+I_{20}+I_{11}$ It is evident that this "inclusion" relationship is well suitable to be expressed using the data structure of stack. For one "inclusion" relationship, it means shifting a number corresponding to the target sub-item set which are included into the state stack. In this way, it is possible to have uniform description mechanism for both distributed item sets and traditional item sets.

Figure 5E:
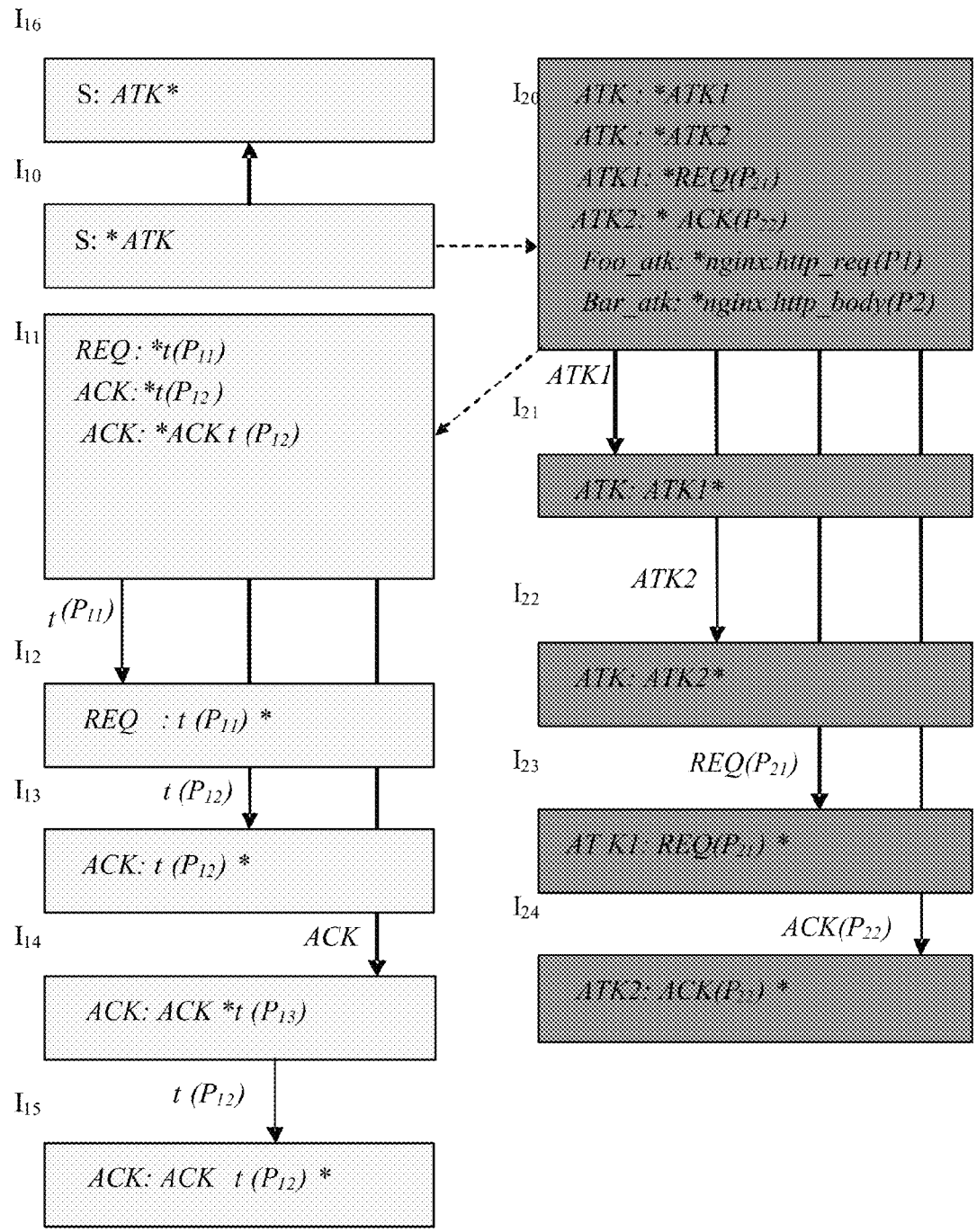

On the basis of FIG. 5D, traditional item sets generating algorithm is used continuously with $I_{10}$, $I_{20}$ and $I_{11}$ as kernels to obtain a complete distributed item sets, as shown in FIG. 5E.

In FIG. 5E, the left side is maintained by the grammar parser module $M_1$ (including two kernels, $I_{10}$ and $I_{11}$, respectively), and the right side is maintained by the grammar parser module $M_2$, and the dashed line part is maintained by the grammar control module $M_0$. According to this manner, the local parsing table of the grammar parser module $M_1$, the local parsing table of the grammar parser module $M_2$ and the scheduling strategy table of the grammar control module $M_0$ as shown in Table 1, Table 2 and Table 3, respectively, may be obtained.

TABLE 1

Local parsing table of grammar parser module $M_1$ (action table and jump table)

| | ACTION | | | | GOTO | | | | | |
|---|---|---|---|---|---|---|---|---|---|---|
| state | t | t($p_{11}$) | t($p_{12}$) | # | REQ | REQ($p_{21}$) | ACK | ACK($p_{22}$) | ATK1 | ATK2 | ATK |
| $I_{10}$ | →$M_0$ | | | | | | | | | | +6 |
| $I_{11}$ | | +2 | +3 | | →$M_0$ | | +4 & →$M_0$ | | | | |
| $I_{12}$ | | | | | | | $R_{11}$ | | | | |
| $I_{13}$ | | | | | | | $R_{12}$ | | | | |
| $I_{14}$ | | | +5 | | | | | | | | |
| $I_{15}$ | | | | | | | $R_{13}$ | | | | |
| $I_{16}$ | | | | succ | | | | | | | |

TABLE 2

Local parsing table of grammar parser module $M_2$ (action table and jump table)

| | ACTION | | | | GOTO | | | | | | |
|---|---|---|---|---|---|---|---|---|---|---|---|
| state | t | $t(p_{11})$ | $t(p_{12})$ | # | REQ | $REQ(p_{21})$ | ACK | $ACK(p_{22})$ | ATK1 | ATK2 | ATK |
| $I_{20}$ | $\to M_0$ | | | | +3 | | +4 | | +1 | +2 | $\to M_0$ |
| $I_{21}$ | | | | | | $R_{23}$ | | | | | |
| $I_{22}$ | | | | | | $R_{24}$ | | | | | |
| $I_{23}$ | | | | | | $R_{21}$ | | | | | |
| $I_{24}$ | | | | | | $R_{22}$ | | | | | |

TABLE 3

Scheduling strategy table of grammar control module $M_0$ (action table and jump table)

| | ACTION | | | | GOTO | | | | | | |
|---|---|---|---|---|---|---|---|---|---|---|---|
| state | t | $t(p_{11})$ | $t(p_{12})$ | # | REQ | $REQ(p_{21})$ | ACK | $ACK(p_{22})$ | ATK1 | ATK2 | ATK |
| $I_{10}$ | $+0, \to M_2$ | | | | | | | | | | |
| $I_{20}$ | $+1, \to M_1$ | | | | | | | | | | | $-0, \to M_1$ |
| $I_{11}$ | | | | | $-1, \to M_2$ | | $-1, \to M_2$ | | | | |

Figure 6:
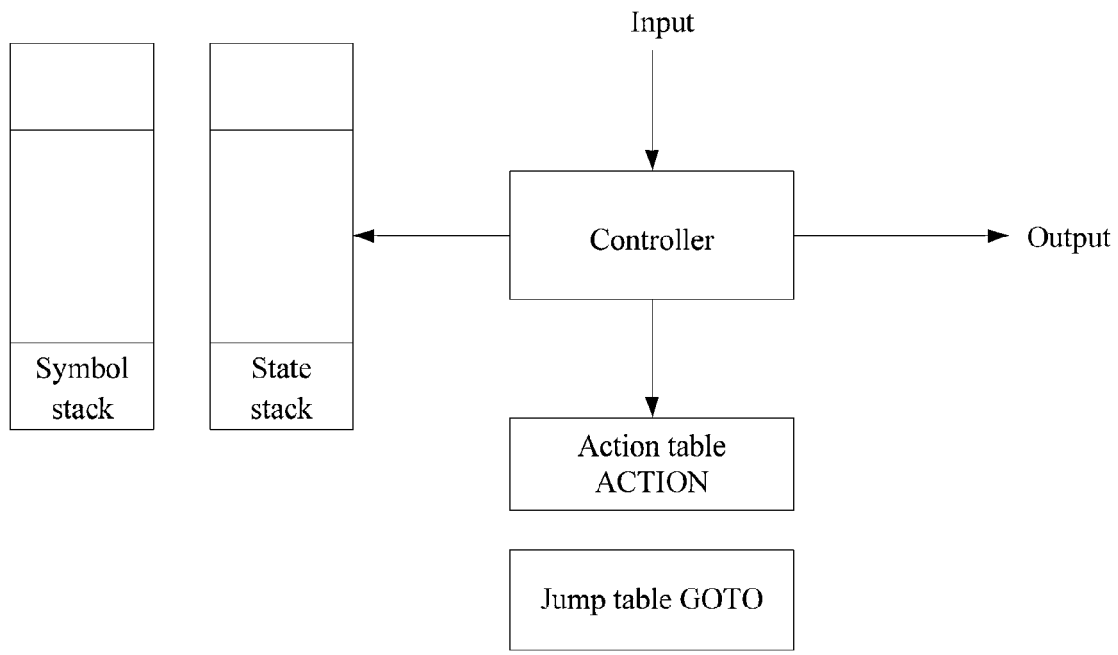
FIG. 6 is a logical diagram showing a controller for an embodiment of a grammar parser module according to the present invention.

While parsing an network attack event according to the generated local parsing tables, each grammar parser module uses PLR(0) parsing algorithm. The PLR(0) parsing algorithm includes a local parsing table, a state stack, a symbol stack and a controller, as shown in FIG. 6. The state stack is configured to save state information, and the symbol stack is configured to save symbol information. The controller of the grammar parser module looks up in the local parsing table according to currently input symbols and the top state of the state stack, so as to obtain an action that should be taken, and then apply corresponding operations on the state stack and the symbol stack.

In addition to actions "copy", "shift", "merge", "reduce", "split", "success" and "fault" mentioned in the Chinese Patent with grant No. CN101060396B, the controller of the grammar parser module in the present invention can also support a new action, "move". Meanings of the above-mentioned actions will be explained below.

Copy: The top state indicates that the controller corresponds to a plurality of actions, which means the state can not meet parsing requirements at present, and therefore the stack needs to be copied.

Shift: The top state indicates that the parser can only continue parsing after a further event is received, if there is one receivable input symbol right now, then the input symbol is pushed into the symbol stack.

Merge: If top states of multiple stacks are completely consistent, then one of them may perform parsing on behalf of others. Merging can decrease redundant computation as much as possible.

Reduce: If the content in the stack is a state sequence w, and if there is a production A:w, this means that the state sequence w in the stack may be cleared and A is then used as an input symbol.

Split: After the representative stack completes parsing on behalf of multiple state stacks, it would return the obtained symbol back to various state stacks so as to release the representation relationship.

Succ: This is a special case of reduction in which a sequence w consisting of all states in the stack is reduced to a target symbol S, which means parsing is successful.

Move: This action means the control is switched to other grammar parser modules or grammar control modules without consuming the event currently to be processed.

The processing flow of the controller has been described in detail in the patent application with grant No. CN101060396B, and will not be explained herein anymore.

Figure 7:
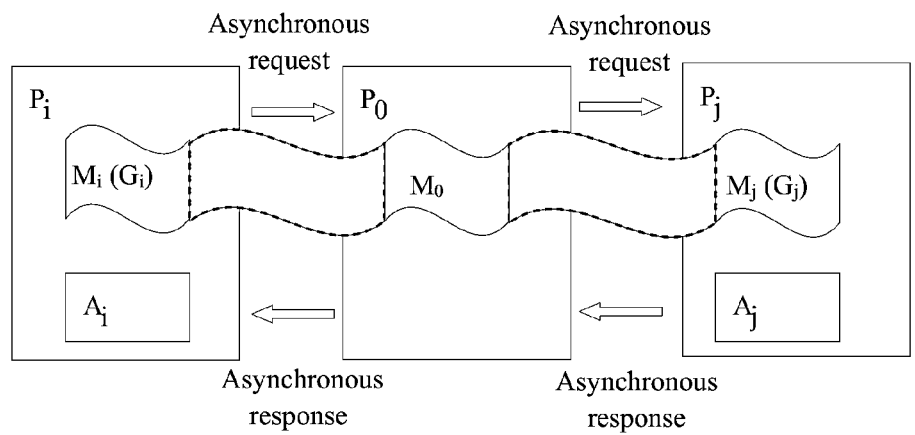
FIG. 7 is a flowchart showing the parsing process of a distributed predicative PLR(0) grammar.

In the present invention, the parsing process for the distributed predicative PLR(0) has an operation flow shown in FIG. 7, and a specific procedure is shown in FIG. 2.

In the present invention, a shared parsing stack is used to keep distributed status information. At any given moment, only one grammar parser module can possess this parsing stack. The shared parsing stack has an important advantage that, when a grammar parser module or grammar control module is possessing certain shared parsing stack, other grammar parser modules can not possess this parsing stack. This makes it impossible for other grammar parser modules to process subsequent events in the session until the current event is processed, hence ensuring consistency between the order of processing events in the session and the order that events arrive.

Figure 8:
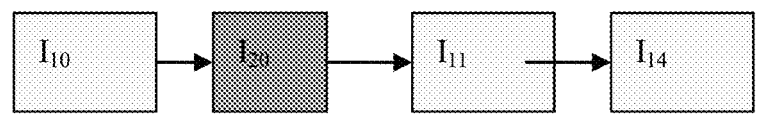
FIG. 8 is a diagram showing a state of a distributed state stack.

The current grammar parser module will use its own parsing tables and events to be detected to modify states for the stack area that the current grammar parser module is in charge of, until the current grammar parser module completes local parsing. Next, the control flow is passed on to the grammar control module according to instructions of the local parsing table. Next, the grammar control module $M_0$ passes the parsing stack to a further grammar parser module. This process continues until the final parsing is completed. FIG. 8 shows a state of a shared parsing stack in which $I_{10}$, $I_{11}$ and $I_{14}$ are maintained by the grammar parser module $M_1$ and $I_{20}$ is maintained by the grammar parser module $M_2$.

For parsing tables constructed for the aforementioned grammar parser modules $M_1$ and $M_2$, it is assumed that a real input is $t(p_{11})$, and $REQ(p_{21})$ is satisfied, the parallel parsing process is shown in Table 4:

TABLE 4

Distributed parsing process of grammar parser modules $M_1$ and $M_2$

| step | Event to be detected | Shared parsing stack | Current grammar parser module | Action | Description |
|---|---|---|---|---|---|
| 1 | t | $I_{10}$ | $M_1$ | $\rightarrow M_0$ | Moving to the grammar control module $M_0$ |
| 2 | t | $I_{10}$ | $M_0$ | $+0, \rightarrow M_2$ | Moving to the grammar analysis module $M_2$ |
| 3 | t | $I_{10} I_{20}$ | $M_2$ | $\rightarrow M_0$ | Moving to the grammar control module $M_0$ |
| 4 | t | $I_{10} I_{20}$ | $M_0$ | $+1, \rightarrow M_1$ | Moving to the grammar parser module $M_1$ |
| 5 | t | $I_{10} I_{20} I_{11}$ | $M_1$ | $+2$ | $p_{11}$ satisfied, shifting in $I_{12}$ |
| 6 |  | $I_{10} I_{20} I_{11} I_{12}$ | $M_1$ | $R_{11}$ | Reduced with rule $R_{11}$ to obtain event REQ |
| 7 | REQ | $I_{10} I_{20} I_{11}$ | $M_1$ | $\rightarrow M_0$ | Moving to the grammar control module $M_0$ and return event REQ at the same time |
| 8 | REQ | $I_{10} I_{20} I_{11}$ | $M_0$ | $-1, \rightarrow M_2$ | Deleting $I_{11}$, moving to the grammar parser module $M_2$ and returning event REQ at the same time |
| 9 | REQ | $I_{10} I_{20}$ | $M_2$ | $+3$ | Shifting in $I_{23}$ due to $p_{21}$ satisfied |
| 10 |  | $I_{10} I_{20} I_{23}$ | $M_2$ | $R_{21}$ | Reduced to ATK1 |
| 11 | ATK1 | $I_{10} I_{20}$ | $M_2$ | $+1$ | Shifting in $I_{21}$ |
| 12 |  | $I_{10} I_{20} I_{21}$ | $M_2$ | $R_{23}$ | Reduced to ATK |
| 13 | ATK | $I_{10} I_{20}$ | $M_2$ | $\rightarrow M_0$ | Moving to the grammar control module $M_0$ |
| 14 | ATK | $I_{10} I_{20}$ | $M_0$ | $-0, \rightarrow M_1$ | Deleting $I_{20}$, then moving to the grammar parser module $M_1$ and returning event ATK at the same time |
| 15 | ATK | $I_{10}$ | $M_1$ | $+6$ | Shifting $I_{16}$ |
| 16 |  | $I_{10} I_{16}$ | $M_1$ | Succ | First t parsed |

If two events (i.e., $t_1$ and $t_2$) are input in which $t_1$ satisfies $t_1(p_{12})$ but not satisfies ACK($p_{22}$), $t_2$ satisfies both $t_2(p_{12})$ and ACK($p_{22}$). Let's consider if the distributed grammar supports the saving of states. According to Table 5, the first several steps of ACK are identical with the parsing of REQ, however, from the seventh step, they split.

TABLE 5

Distributed parsing process of grammar parser modules $M_1$ and $M_2$

| Step | Event to be detected | Shared parsing stack | Current grammar parser module | Action | Description |
|---|---|---|---|---|---|
| 1 | $t_1$ | $I_{10}$ | $M_1$ | $\rightarrow M_0$ | Moving to the grammar control module $M_0$ |
| 2 | $t_1$ | $I_{10}$ | $M_0$ | $+0, \rightarrow M_2$ | Moving to the grammar parser module $M_2$ |
| 3 | $t_1$ | $I_{10} I_{20}$ | $M_2$ | $\rightarrow M_0$ | Moving to the grammar control module $M_0$ |
| 4 | $t_1$ | $I_{10} I_{20}$ | $M_0$ | $+1, \rightarrow M_1$ | Moving to the grammar parser module $G_1$ |
| 5 | $t_1$ | $I_{10} I_{20} I_{11}$ | $M_1$ | $+2$ | $p_{12}$ satisfied, shifting in $I_{13}$ |
| 6 |  | $I_{10} I_{20} I_{11} I_{13}$ | $M_1$ | $R_{12}$ | Reduced with $R_{12}$ to obtain ACK. |
| 7 | ACK | $I_{10} I_{20} I_{11}$ | $M_1$ | $+4 \& \rightarrow M_0$ | Splitting |
| 8 |  | $I_{10} I_{20} I_{11} I_{14}$ | $M_1$ |  | Analysis stops here, waiting for the next event. |
| 9 | ACK | $I_{10} I_{20} I_{11}$ | $M_0$ | $-1, \rightarrow M_2$ |  |
|  |  | $I_{10} I_{20} I_{11} I_{14}$ | $M_1$ |  |  |
|  | ACK | $I_{10} I_{20}$ | $M_2$ |  | If ACK can not satisfy $p_{22}$, the parsing thread will be released. |
| 10 | $t_2$ | $I_{10} I_{20} I_{11} I_{14}$ | $M_1$ | $+5$ | $p_{12}$ satisfied, shifting in $I_{15}$ |
| 11 |  | $I_{10} I_{20} I_{11} I_{14} I_{15}$ | $M_1$ | $R_{13}$ | Reduced with $R_{12}$ to obtain ACK. |
| 12 | ACK | $I_{10} I_{20} I_{11}$ | $M_1$ | $+4 \& \rightarrow M_0$ | Splitting again |
| 13 |  | $I_{10} I_{20} I_{11} I_{14}$ | $M_1$ |  | Analysis stops here, waiting for the next event. |
|  | ACK | $I_{10} I_{20} I_{11}$ | $M_0$ | $-1, \rightarrow M_2$ | Moving to the grammar parser module $M_2$ |
| 14 |  | $I_{10} I_{20} I_{11} I_{14}$ | $M_1$ |  |  |
|  | ACK ($p_{22}$) | $I_{10} I_{20}$ | $M_2$ | $+4$ | ACK satisfies $p_{22}$, shifting in $I_{24}$ |
| 15 |  | $I_{10} I_{20} I_{11} I_{14}$ | $M_1$ |  |  |
|  |  | $I_{10} I_{20} I_{24}$ | $M_2$ | $R_{22}$ | Reduced to ATK2 |
| 16 |  | $I_{10} I_{20} I_{11} I_{14}$ | $M_1$ |  |  |
|  | ATK2 | $I_{10} I_{20}$ | $M_2$ | $+2$ | Shifting in $I_{22}$ |
| 17 |  | $I_{10} I_{20} I_{11} I_{14}$ | $M_1$ |  |  |
|  |  | $I_{10} I_{20} I_{22}$ | $M_2$ | $R_{24}$ | Reduced to ATK |
| 18 |  | $I_{10} I_{20} I_{11} I_{14}$ | $M_1$ |  |  |
|  | ATK | $I_{10} I_{20}$ | $M_2$ | $\rightarrow M_0$ |  |
| 19 |  | $I_{10} I_{20} I_{11} I_{14}$ | $M_1$ |  |  |
|  | ATK | $I_{10} I_{20}$ | $M_0$ | $-0, \rightarrow M_1$ | Deleting $I_{20}$, then moving to the grammar parser module $M_1$ |

TABLE 5-continued

Distributed parsing process of grammar parser modules $M_1$ and $M_2$

| Step | Event to be detected | Shared parsing stack | Current grammar parser module | Action | Description |
|---|---|---|---|---|---|
| 20 | ATK | $I_{10} I_{20} I_{11} I_{14}$ $I_{10}$ | $M_1$ $M_1$ | +6 | Shifting in $I_{16}$ |
| 21 | | $I_{10} I_{20} I_{11} I_{14}$ $I_{10} I_{16}$ | $M_1$ $M_1$ | Succ | |

Figure 9:
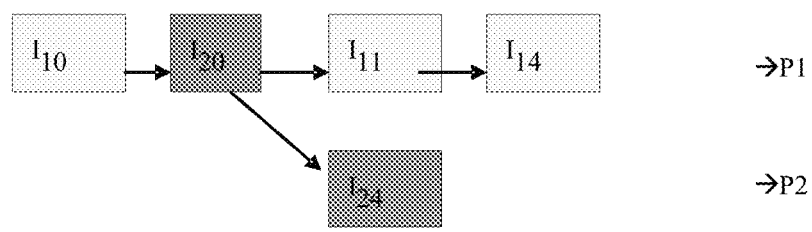
FIG. 9 shows a state stack to which the step 15 in process of Table 5 corresponds.

In step 15 of the Table 5, a state stack shown in FIG. 9 would be obtained. The parsing stack has two top states, one indicating that the grammar parser module $M_1$ keeps tracking ACK, and the other indicating the grammar parser module $M_2$ has already found ATK2.

Furthermore, in the structure shown in FIG. 7, after a grammar parser module $G_i$ passes a certain event to the grammar control module $M_0$ in a certain session, the grammar parser module $M_i$ can only be blocked there, unable to process events on other sessions, therefore, frequent process switching would occur for completing a parsing.

Preferably, in another example of the present invention, an asynchronous scheduling module is used to solve the above problem. In this example, for each session, the current grammar parser module maintains a very light weight co-routine that may be in several states including ready, executing, blocking and completion states. After creation, each co-routine would enter the ready state. The current grammar parser module selects some co-routines to enter executing state at certain time according to the scheduling strategy of the co-routines. When the co-routine needs cooperation from other grammar parser modules, the current grammar parser module sends an asynchronous scheduling request event to the grammar control module engine, and then the co-routine enters blocking state. Thereafter, the current grammar parser module can select the next co-routine that is in ready state to enter executing state, and executes it.

Figure 10:
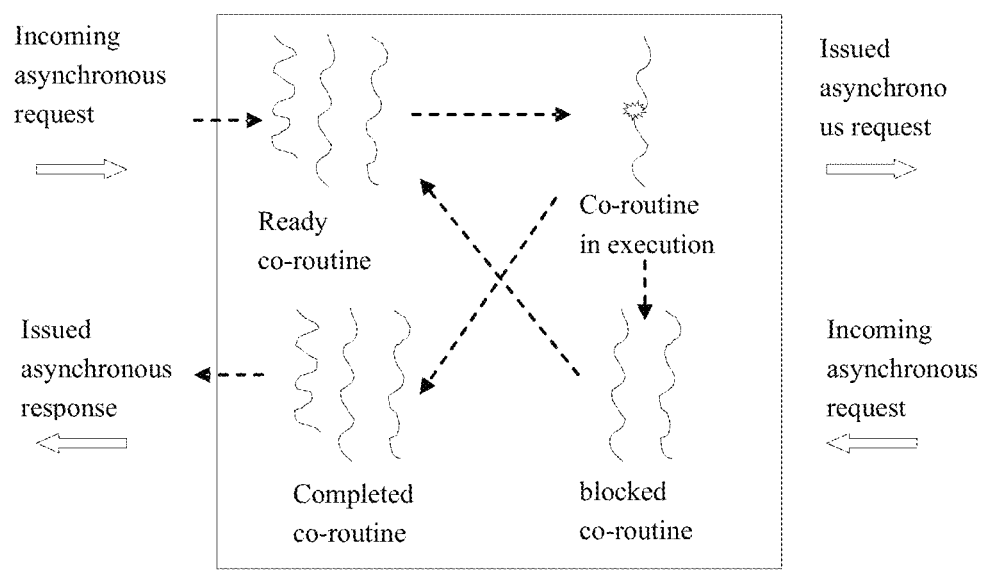
FIG. 10 is a flowchart showing an asynchronous scheduling strategy performed while using a plurality of co-routines.

When the target grammar parser module returns an acknowledgement event, those co-routines in blocking state will be waken up and enter ready state again. This process is then repeated to complete parsing for a certain session, and finally the co-routine enters completion state. The first grammar parser module finally releases the co-routine to complete parsing of a session. FIG. 10 briefly depicts the life cycle of the co-routine. Introducing multiple light weighted co-routines allows not only coordinated parsing among multiple grammar parser modules, but also drastic reduction of the number of process switching, which reduces performance loss to the maximum extent.

The event detection methods in a distributed environment according to embodiments of the present invention are described above with reference to FIGS. 2 to 10. The event detection apparatus in a distributed environment according to embodiments of the present invention will be described below with reference to FIGS. 11 to 13.

Figure 11:
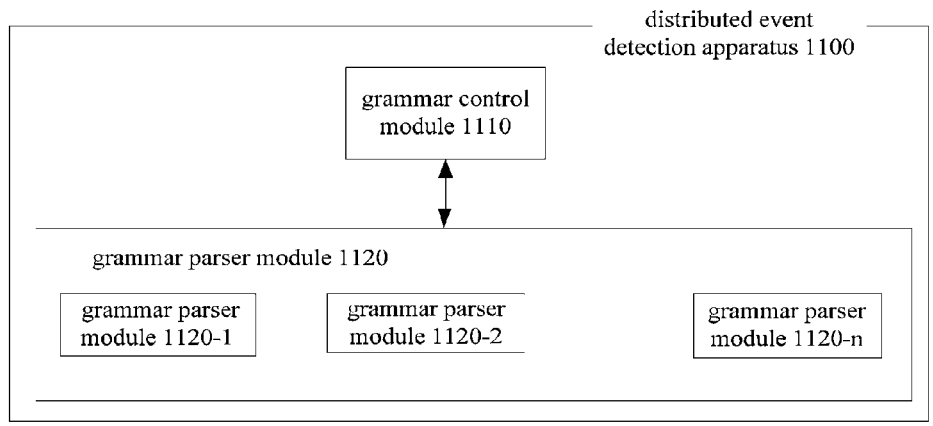
FIG. 11 is a block diagram showing an event detection device in a distributed environment according to the present invention.

FIG. 11 is a block diagram showing an event detection device 1100 in a distributed environment according to the present invention.

As shown in FIG. 11, the event detection device 1100 according to the present invention includes a grammar control module 1110 and a plurality of grammar parser modules 1120, such as grammar parser modules 1120-1, 1120-2, . . . , 1120-*n*.

The grammar parser module 1120 is configured to parse received events based on the generated local parsing tables of the grammar parser module, and return the parsing results or the scheduling requests to the grammar control module 1110.

The grammar control module 1110 is configured to schedule one or several grammar parser modules of the plurality of grammar parser modules for grammar parsing based on the generated scheduling strategy table and according to scheduling requests issued by various grammar parser modules, after the first grammar parser module receives events to be detected; and send parsing results returned from the scheduled grammar parser modules to grammar parser modules that initiate scheduling requests for further grammar parsing, wherein the scheduling strategy table reflects association relation between the event to be detected and the grammar parser module used to process it.

Figure 12:
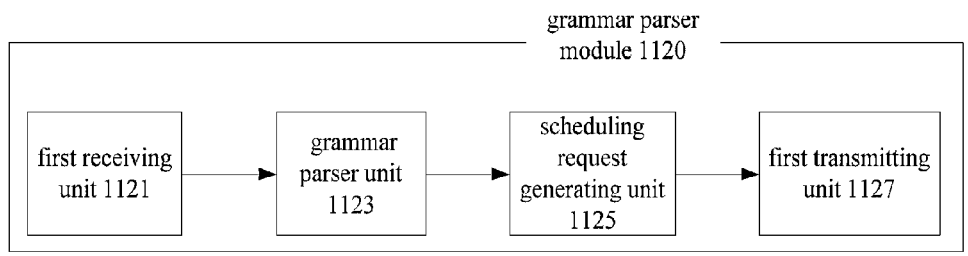
FIG. 12 is a block diagram showing an example of the grammar parser module in FIG. 11.

FIG. 12 is a block diagram showing an example of the grammar parser module 1120 in FIG. 11. As shown in FIG. 12, in one example, the grammar parser module 1120 may include a first receiving unit 1121, a grammar parser unit 1123, a scheduling request generating unit 1125 and a first transmitting unit 1127.

When the grammar parser module 1120 is the first grammar parser module, the first receiving unit 1121 is configured to receive events to be detected and receive parsing results returned from the grammar control module. The grammar parser unit 1123 is configured to conduct grammar parsing on the received events to be detected according to the generated local parsing table of the grammar parser module, wherein local parsing tables of grammar parser modules are generated, by means of the distributed item sets generating algorithm, for event detection rules preset by distributed predicative context-free grammars under the control of the grammar control module. The scheduling request generating unit 1125 is configured to, when a non-parsable event is found during parsing process of the events to be detected, generate a scheduling request that includes the non-parsable event as the next event to be detected. The first transmitting unit 1127 is configured to transmit the scheduling request to the grammar control module, or output detection results of the detected event to outside when the grammar parser module obtains parsing results.

When the grammar parser module 1120 is not the first grammar parser module, the first receiving unit 1121 is configured to receive a scheduling request including the next event to be detected from the grammar control module, and receive parsing results returned from the grammar control module. The grammar parser unit 1123 is configured to conduct grammar parsing on the next event to be detected included in the received scheduling request according to the generated local parsing table of the grammar parser module, wherein local parsing tables of grammar parser modules are generated, by means of the distributed item sets generating algorithm, for event detection rules preset by distributed predicative context-free grammars under the control of the grammar control module. The scheduling request generating unit 1125 is configured to, when a non-parsable event is found during parsing process of the next event to be detected, generate a scheduling request that includes the non-parsable event as the next event to be detected. The first transmitting unit 1127 is configured to transmit the scheduling request to the grammar control module, or return parsing results to the grammar control module when the grammar parser module obtains parsing results.

Figure 13:
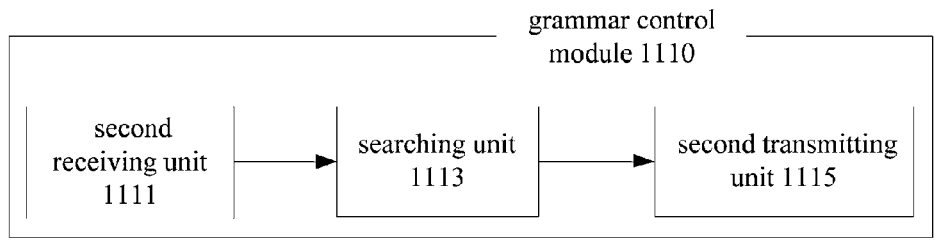
FIG. 13 is a block diagram showing an example of the grammar control module in FIG. 11.

FIG. 13 is a block diagram showing an example of the grammar control module 1110 in FIG. 11. As shown in FIG. 13, the grammar control module 1110 includes a second receiving unit 1111, a searching unit 1113 and a second transmitting unit 1115.

The second receiving unit 1111 is configured to receive a scheduling request including the next event to be detected from the grammar parser module issuing the scheduling request, and receive parsing results including the generated event from the grammar parser module which obtained the parsing results.

The searching unit 1113 is configured to search in the generated scheduling strategy table, a target grammar parser module matching the next event to be detected after receiving the scheduling request including the next event to be detected. The scheduling strategy table reflects association relation between the event to be detected and the grammar parser module used to process it.

The second transmitting unit 1115 is configured to, after finding out the target grammar parser module, transmit a scheduling request including the next event to be detected to the target grammar parser module, and transmit the received parsing results to the grammar parser module issuing the scheduling request for further grammar parsing, after receiving parsing results from the target grammar parser module.

Furthermore, in another example of the present invention, the grammar parser unit 1120 further includes a local parsing table generating unit (not shown) configured to generate, by means of the distributed item sets generating algorithm, item sets of the grammar parser module for event detection rules preset by distributed predicative context-free grammars under the control of the grammar control module, and convert it into a local parsing table.

Furthermore, the grammar parser module 1120 may further include an item set generating request generating unit (not shown) configured to generate an item set generating request when it is determined there is a non-resolvable event during generating a local parsing table. The item set generating request includes the non-resolvable event as the next event to be resolved. In such a case, the first transmitting unit in the grammar parser module is further configured to transmit the generated item set generating request to the grammar control module, and forward it to the target grammar parser module under the control of the grammar control module, wherein the target grammar parser module is determined by the searching unit in the grammar control module based on the next event to be detected included in the item set generating request, according to the open event list registered by each grammar parser module in advance. After generating item sets of the target grammar parser module, the first transmitting unit in the target grammar parser module further transmits a first one of the generated item set numbers and a list of events available for reception to the grammar control module, and the grammar control module further includes a scheduling strategy table generating unit (not shown) configured to generate a scheduling strategy table based on the received item set number and the list of events available for reception. Furthermore, in another example, the grammar control module may further include an open event list generating unit (not shown) configured to generate an open event list according to events that may be invoked by other grammar parser modules registered by various grammar parser modules.

Furthermore, in another example of the present invention, the grammar parser module 1120 and the grammar control module 1110 may further include an asynchronous scheduling unit (not shown) for achieving asynchronous parallel processing by means of multiple co-routines in each of the grammar parser modules and grammar control modules, the co-routines are light weight user threads maintained by the grammar parser modules for each session (e.g. TCP connection).

The present invention has the following beneficial effects compared with prior art:

1. The present invention provides a novel distributed event detection method particularly applicable to detecting events in sophisticated network attacks. The present invention enables software modules distributed in different processes (or threads) to cooperate with uniform grammar rules, in order to achieve uniform parsing object, which makes the method described in the present patent applicable to distributed environment.

2. By using distributed predicative context-free grammars, the present invention may hide item sets corresponding to individual sub-grammars inside the grammar parser module, rather than diffusing into item sets of other grammars, hence avoiding global item sets and enhancing system's extendibility.

3. Efficient detection of attacks may be realized. With the detection algorithm of the distributed predicative context-free grammars, protocol parsing and attack detection processes distributed in multiple processes (or threads) are closely combined, avoiding unnecessary operations for the system.

4. Asynchronous scheduling modules employed in the present invention allow simultaneous processing of a lot of concurrent sessions and efficient parsing on the distributed predicative context-free grammar, hence leading to high efficiency.

Those skilled in the art should also appreciated that illustrative logic blocks, modules, circuits and algorithm steps described in connection with the disclosure herein may be implemented as electronic hardware, computer software or combination of both. In order to describe the interchangeability of hardware and software clearly, general description is provided for the illustrative assemblies, blocks, modules, circuits and steps in terms of their functions. Whether the functions are implemented as software or hardware depends on specific applications and design constraints imposed on the overall system. Those skilled in the art may implement the functions in various ways for each specific application; however, this implementation decision should not be interpreted as departing from the scope of the present invention.

Illustrative logic blocks, modules and circuits described in connection with the disclosure herein may be realized or executed by the following components that are designed to execute the functions described herein: general purpose processors, digital signal processors (DSP), application specific integrated circuits (ASIC), field programmable gate arrays (FPGA) or other programmable logic devices, discrete gates or transistor logics, discrete hardware components or any combinations thereof. The general purpose processors may be microprocessors, but alternatively, processors may be any traditional processors, controllers, microcontrollers or state machines. A processor may also be implemented as a combination of computing devices, such as a combination of DSP and microprocessor, multiple microprocessors, one or more microprocessors incorporating DSP kernels or any other kind configurations.

Steps of the method or algorithm described in connection with the disclosure herein may be directly embodied in hardware, software modules executed by a processor or a combination of both. A software module may reside in a RAM memory, a flash memory, a ROM memory, an EPROM memory, an EEPROM memory, a register, a hard disk, a removable disk, a CD-ROM or any other form of storage medium known in the art. The illustrative storage medium is coupled to the processor, enabling the processor to read information from or write information into the storage medium. In an alternative solution, the storage medium may be integrated with the processor. The processor and the storage medium may reside in ASICs. The ASICs may reside in a user terminal. In an alternative solution, the processor and the storage medium may reside in a user terminal as discrete components.

In one or more of illustrative designs, the functions may be implemented in hardware, software, firmware or any combination thereof. If implemented in software, the functions may be stored on a computer readable medium or transferred via a computer readable medium as one or more instructions or codes. Computer readable media may include computer storage media and communication media that include any media that helps transferring computer programs from one place to another. The storage media may be any available media accessible by a general purpose or special purpose computer. As an example without limitation, the computer readable media may include RAM, ROM, EEPROM, CD-ROM or other optical disk storage devices, magnetic disk storage devices or other magnetic storage devices, or any other media that may be used to carry out or store the required program codes in form of instructions or data structures and accessible by a general or special purpose computer or a general purpose or special purpose processor. As used herein, disks and optical disks include compact disks (CD), laser disks, optical disks, digital versatile disks (DVD), floppy disks, blue-ray disks, wherein disks usually reproduce data magnetically while optical disks reproduce data with laser optically. Combinations of the above should also be included in the scope of computer readable media.

While the above disclosure shows illustrative embodiments of the present invention, it should be noted that various changes and modifications may be made without departing from the scope of the present invention as defined in claims. Functions, steps and/or actions of the method claims according to the inventive embodiments described herein are not necessarily executed in any specific order. Furthermore, while elements of the present invention may be described or claimed in singular form, it is also possible to conceive multiple of them, unless they are limited to singular specifically.

While embodiments according to the present invention have been described above with reference to drawings, those skilled in the art should appreciate that various modifications may be made to embodiments provided in the above-mentioned present invention without departing from the spirit of the present invention. Therefore, the scope of the present invention should be defined by contents of the appended claims.

What is claimed is:

1. An event detection method in a distributed environment, which is carried out by an apparatus comprising a grammar control module and a plurality of grammar parser modules including at least a first grammar parser module for initiating the detection of event, the method comprises:

after the first grammar parser module generates a non-parsable event during an parsing process of a received event to be detected, executing the following process under a control of the grammar control module, until the first grammar parser module obtains a detection result of the event to be detected, wherein the first grammar parser module is a hardware module;

at the current grammar parser module, including the event that the current grammar parser module is not capable of parsing into a scheduling request as a next event to be detected, and sending the scheduling request to the grammar control module;

scheduling, by the grammar control module, other grammar parser module of the plurality of grammar parser modules as a target grammar parser module for parsing based on the generated scheduling strategy table, according to the next event to be detected included in the scheduling request, the scheduling strategy table reflecting an association relation between the event to be detected and the grammar parser module used to process the event to be detected;

parsing in the scheduled target grammar parser module the next event to be detected, based on a local parsing table of the target grammar parser module; and returning, by the target grammar parser module, the parsing result to the grammar control module for further grammar parsing when no event is found that the target grammar parser module is not capable of parsing during the parsing process of the next event to be detected, or repeating the above-mentioned process with the target grammar parser module as a new current grammar parser module when an event is found that the target grammar parser module is not capable of parsing during the parsing process of the next event to be detected, wherein, the local parsing tables of the grammar parser modules are generated, by means of a distributed item sets generating algorithm, for event detection rules preset by distributed predicative context-free grammars under the control of the grammar control module.

2. The event detection method of claim 1, wherein generating the local parsing tables of the grammar parser modules and the scheduling strategy tables of the grammar control module by means of the distributed item sets generating algorithm comprises:

for each grammar parser module,
when the grammar parser module determines there exists a non-resolvable event during performing grammar analysis, sending an item set generating request including the non-resolvable event to the grammar control module;

after receiving the item set generating request, determining, by the grammar control module, the target grammar parser module according to an open event list registered in advance by each grammar parser module based on the event to be resolved, and sending an item set generating request including the non-resolvable event to the target grammar parser module;

after receiving the item set generating request, generating, by the target grammar parser module, item sets with the event as a grammar target based on the predicative context-free grammar, and converting the generated item sets into a pushdown automaton parsing table that supports parallel parsing;

after generating the item sets of the target grammar parser module, returning, by the target grammar parser module, the first one of the generated item set numbers and a list of events available for reception to the grammar control module; and generating, by the grammar control module, the scheduling strategy table based on the first item set number and the list of events available for reception returned by the target grammar parser module.

3. The event detection method of claim 2, wherein the open event list of the grammar control module are generated by various grammar parser modules through registering events that other grammar parser modules are capable of invoking with the grammar control module.

4. The event detection method of claim 1, wherein scheduling, by the grammar control module, other grammar parser modules of the plurality of grammar parser modules as the target grammar parser modules for further grammar parsing according to scheduling requests sent by the current grammar parser module, based on the generated scheduling strategy table comprises:

after receiving the scheduling request including the next event to be detected sent by the current grammar parser module, searching, by the grammar control module, in the scheduling strategy table the target grammar parser module matching the next event to be detected; and after finding out the target grammar parser module, sending, by the grammar control module, the scheduling request including the next event to be detected to the target grammar parser module, so as to request the target grammar parser module to perform grammar parsing on the next event to be detected.

5. The event detection method of claim 1, wherein the scheduling request further comprises a shared parsing stack.

6. The event detection method of claim 1, wherein a plurality of co-routines are employed to allow asynchronous parallel processing in each of the grammar parser modules and the grammar control modules, the co-routines being light weight user threads maintained by the grammar parser module for each session.

7. An event detection apparatus in a distributed environment, comprising:

a processor;

a grammar control module and a plurality of grammar parser modules including at least a first grammar parser module for initiating the detection of event, wherein each of the grammar parser modules comprises:

a first receiving unit configured to receive a event to be detected or receive a scheduling request including a next event to be detected from the grammar control module, and receive a parsing result returned from the grammar control module;

a grammar parser unit configured to perform grammar parsing on the received event to be detected or the next event to be detected in the scheduling request, based on the generated local parsing table of the grammar parser module;

a scheduling request generating unit configured to, when a non-parsable event is found during the parsing process of the events to be detected, generate a scheduling request that includes the non-parsable event as the next event to be detected; and a first transmitting unit configured to transmit the scheduling request to the grammar control module, or output detection results of the detected event to outside or return the parsing results to the grammar control module when the grammar parser module obtains parsing results, wherein, the local parsing tables of the grammar parser modules are generated, by means of a distributed item sets generating algorithm, for event detection rules preset by predicative context-free grammars under the control of the grammar control module, wherein the grammar control module comprises:

a second receiving unit configured to receive the scheduling request including the next event to be detected or parsing results including the generated event from the target grammar parser module;

a searching unit configured to search in the generated scheduling strategy table a target grammar parser module matching the next event to be detected after receiving the scheduling request including the next event to be detected, the scheduling strategy table reflecting an association relation between the event to be detected and the grammar parser module used to process the event to be detected; and a second transmitting unit configured to, after finding out the target grammar parser module, transmit the scheduling request including the next event to be detected to the target grammar parser module, and transmit the received parsing results of the next event to be detected to the grammar parser module issuing the scheduling request for further grammar parsing.

8. The event detection apparatus of claim 7, wherein each of the grammar parser modules further comprises:

a local parsing table generating unit configured to generate, by means of a distributed item sets generating algorithm, item sets of the parser process for event detection rules preset by the distributed predicative context-free grammars under the control of the grammar control module, and convert it into a local parsing table.

9. The event detection apparatus of claim 8, wherein each of the grammar parser modules further comprises:

an item set generating request generating unit configured to generate an item set generating request when it is determined that there exists a non-resolvable event during generating the local parsing table, the item set generating request including the non-resolvable event as the next event to be resolved, wherein, the first transmitting unit in the grammar parser module is further configured to transmit the generated item set generating request to the grammar control module, and forward it to the target grammar parser module under the control of the grammar control module, the target grammar parser module being determined by the searching unit in the grammar control module based on the next event to be resolved included in the item set generating request according to the open event list registered by each grammar parser module in advance, wherein, after generating item sets of the target grammar parser module, the first transmitting unit in the target grammar parser module transmits the first one of the generated item set numbers and a list of events available for reception to the grammar control module, and wherein the grammar control module further comprises a scheduling strategy table generating unit configured to generate a scheduling strategy table based on the received item set number and the list of events available for reception.

10. The event detection apparatus of claim 9, wherein the grammar control module further comprises:

an open event list generating unit configured to generate an open event list according to events capable of being invoked by other grammar parser modules that registered by various grammar parser modules.

11. The event detection apparatus of claim 7, wherein each of the grammar parser modules and the grammar control module further comprises:

an asynchronous scheduling unit configured to use a plurality of co-routines to allow asynchronous parallel processing in each of the grammar parser modules and the grammar control module, the co-routines being light weight user threads maintained by the grammar parser module for each session.

* * * * *